(12) United States Patent
Liu et al.

(10) Patent No.: US 9,007,314 B2
(45) Date of Patent: Apr. 14, 2015

(54) METHOD FOR TOUCH PROCESSING AND MOBILE TERMINAL

(75) Inventors: Xiangtao Liu, Beijing (CN); Dayong Gan, Beijing (CN)

(73) Assignees: Beijing Lenovo Software Ltd., Beijing (CN); Lenovo (Beijing) Co., Ltd., Beijing (CN)

(*) Notice: Subject to any disclaimer, the term of this patent is extended or adjusted under 35 U.S.C. 154(b) by 158 days.

(21) Appl. No.: 13/520,221

(22) PCT Filed: Dec. 24, 2010

(86) PCT No.: PCT/CN2010/080229
§ 371 (c)(1),
(2), (4) Date: Jul. 2, 2012

(87) PCT Pub. No.: WO2011/079749
PCT Pub. Date: Jul. 7, 2011

(65) Prior Publication Data
US 2013/0201118 A1    Aug. 8, 2013

(30) Foreign Application Priority Data
Dec. 30, 2009 (CN) .......................... 2009 1 0244561

(51) Int. Cl.
G06F 3/041      (2006.01)
(52) U.S. Cl.
CPC .............. *G06F 3/041* (2013.01); *G06F 3/0416* (2013.01)
(58) Field of Classification Search
CPC ..... G06F 3/041; G06F 3/033; G06F 3/03547; G06F 3/048; G06F 3/0487; G06F 3/0488; G06F 3/0416

USPC .......... 345/173–175, 156, 163, 169; 715/808, 715/863, 773; 706/15; 455/564, 566; 178/18, 3; 382/200, 103
See application file for complete search history.

(56) References Cited

U.S. PATENT DOCUMENTS

| | | | |
|---|---|---|---|
| 7,561,146 B1* | 7/2009 | Hotelling ...................... | 345/175 |
| 8,239,784 B2* | 8/2012 | Hotelling et al. .............. | 715/830 |
| 2006/0044259 A1* | 3/2006 | Hotelling et al. ............. | 345/156 |
| 2007/0152976 A1* | 7/2007 | Townsend et al. ............ | 345/173 |
| 2008/0012835 A1* | 1/2008 | Rimon et al. .................. | 345/173 |
| 2009/0179865 A1* | 7/2009 | Kumar .......................... | 345/173 |
| 2010/0085323 A1* | 4/2010 | Bogue ........................... | 345/173 |

(Continued)

OTHER PUBLICATIONS

PCT/CN2010/080229 International Preliminary Report on Patentability dated Jul. 4, 2012 (5 pages).

*Primary Examiner* — Ariel Balaoing
*Assistant Examiner* — Darlene M Ritchie
(74) *Attorney, Agent, or Firm* — Brinks Gilson & Lione; G. Peter Nichols

(57) ABSTRACT

A touch processing method and a mobile terminal are described. The mobile terminal includes a touch sensing device that has a first area and a second area. A touching point in the first area has a first response level and a touching point in the second area has a second response level, with the first response level being higher than the second response level. The method includes acquiring a first touching point and a second touching point; and responding to the first touching point when the first touching point is in the first area while the second touching point is in the second area. When a user holds the mobile terminal to operate, the mobile terminal may respond to useful touch commands automatically and shield touch commands generated by the misoperation in the second area.

15 Claims, 6 Drawing Sheets

(56) References Cited

U.S. PATENT DOCUMENTS

| | | |
|---|---|---|
| 2010/0134437 A1* | 6/2010 | Yang et al. .................... 345/174 |
| 2010/0139990 A1* | 6/2010 | Westerman et al. ........ 178/18.03 |
| 2010/0156795 A1* | 6/2010 | Kim et al. ..................... 345/168 |
| 2010/0182247 A1* | 7/2010 | Petschnigg et al. ........... 345/173 |
| 2010/0194703 A1* | 8/2010 | Fedor et al. ................... 345/173 |
| 2010/0235793 A1* | 9/2010 | Ording et al. ................. 715/863 |
| 2011/0069015 A1* | 3/2011 | Nurmi ........................... 345/173 |
| 2011/0095988 A1* | 4/2011 | Singhal ......................... 345/173 |
| 2012/0154294 A1* | 6/2012 | Hinckley et al. .............. 345/173 |
| 2012/0158629 A1* | 6/2012 | Hinckley et al. .............. 706/15 |
| 2012/0262407 A1* | 10/2012 | Hinckley et al. .............. 345/173 |
| 2013/0154983 A1* | 6/2013 | Christiansson et al. ...... 345/173 |

* cited by examiner

METHOD FOR TOUCH PROCESSING AND MOBILE TERMINAL

FIELD OF THE INVENTION

The present application relates to the field of communication technology, and in particular, to a touch processing method and a mobile terminal.

BACKGROUND

An existing terminal with a touch screen includes a touch-type mobile phone and PDA (Personal Digital Assistant) and so on, and does not include any physical keys, such as a keyboard, etc., so that all of operations are implemented by finger or fingers touching the touch screen. Making an existing touch-type mobile phone as an example, it is typically designed to have a large touch screen for displaying. However, during a research for the prior art, inventors of the present application find that a misoperation may occur easily when a user hold the mobile phone closely to perform the touch operation. For example, when the user holds the mobile phone by one hand, his/her thumb may move on the touch screen to perform the touch operation, but a part connecting the thumb with a palm of the hand may touch the touch screen at the same time, such that the touch screen may sense a plurality of touch operations and in turn generate a plurality of touch commands, thus a misoperation may occur. Additionally, in order to avoid a misoperation, the user may be careful to only hold the edges of the mobile phone while holding the mobile phone, but this causes the operation to be inconvenient and accordingly the touch operation experience of the user is decreased.

SUMMARY

An object of the embodiments of the present application is to provide a touch processing method and a mobile terminal, in order to settle problems in the prior art that a misoperation occurs easily when the mobile terminal implements a touch input and the touch operation experience of the user is decreased.

In order to settle the problem above-described, the embodiments of the present application provide solutions as follows.

A touch processing method for a mobile terminal with a touch sensing device, the touch sensing device has a first area and a second area, a touching point in the first area have a first response level and a touching point in the second area has a second response level, the first response level is higher than the second response level, wherein the method comprises: acquiring a first touching point and a second touching point; and responding to the first touching point, when the first touching point is in the first area while the second touching point is in the second area.

The touching point in the first area is responded in a first response mode and the touching point in the second area is responded in a second response mode, and the first response mode is different from the second response mode.

The mobile terminal further includes a first processor and a second processor, the first touching point is responded in the first response mode when the second processor determines the first touching point is in the first area, and the first response mode is to transmit the first touching point to a first processor; and the second touching point is responded in the second response mode when the second processor determines the second touching point is in the second area, and the second response mode is to obtain a touch command corresponding to the second touching point and transmit the touch command to the first processor.

Acquiring the first touching point and the second touching point comprises acquiring the second touching point in the second area during a process of acquiring the first touching point in the first area. The method further comprises: not responding to the second touching point.

Acquiring the first touching point and the second touching point comprises acquiring the first touching point in the first area during a process of acquiring the second touching point in the second area. The method further comprises: terminating the acquiring of the second touching point.

Acquiring the first touching point and the second touching point comprises acquiring the first touching point in the first area and the second touching point in the second area at the same time. The method further comprises: not responding to the second touching point.

Acquiring the first touching point and the second touching point comprises acquiring the first touching point and the second touching point by the second processor.

The method further comprises: the second processor determines a touch command corresponding to the second touching point according to the second touching point acquired from the second area.

The first touching point in the first area is acquired during a process of acquiring the second touching point in the second area. The method further comprises: the second processor transmitting the first touching point to the first processor; the second processor not performing the step of determining a touch command corresponding to the second touching point according to the second touching point acquired from the second area. Responding to the first touching point comprises the first processor responding to the first touching point after receiving the first touching point.

Acquiring the first touching point in the first area during the process of determining the touch command corresponding to the second touching point according to the second touching point acquired from the second area further comprises: the second processor transmitting the first touching point to the first processor; the second processor terminating the step of determining the touch command corresponding to the second touching point according to the second touching point acquired from the second area. Responding to the first touching point comprises the first processor responding to the first touching point after receiving the first touching point.

A mobile terminal with a touch sensing device, the touch sensing device has a first area and a second area, a touching point in the first area has a first response level and a touching point in the second area has a second response level, the first response level is higher than the second response level, further comprising a first processor and a second processor, wherein the second processor comprises an acquiring unit for acquiring a first touching point and a second touching point; the first processor comprises a response unit for responding to the first touching point when the first touching point is in the first area while the second touching point is in the second area.

The touching point in the first area is responded in a first response mode and the touching point in the second area is responded in a second response mode, and the first response mode is different from the second response mode.

The first touching point is responded in the first response mode when the second processor determines the first touching point is in the first area, and the first response mode is to transmit the first touching point to a first processor; and the second touching point is responded in the second response mode when the second processor determines the second touching point is in the second area, and the second response mode is to obtain a touch command corresponding to the second touching point and transmit the touch command to the first processor.

The second processor further comprises: a determination unit for determining a touch command corresponding to the second touching point according to the second touching point acquired from the second area.

The acquiring unit acquires the first touching point in the first area during a process of acquiring the second touching point in the second area. The second processor further comprises: a transmitting unit for transmitting the first touching point to the first processor; and a control unit for controlling the determination unit not to perform the process of determining the touch command corresponding to the second touching point according to the second touching point acquired from the second area. The response unit responds to the first touching point after receiving the first touching point.

The acquiring unit acquires the first touching point in the first area during the process of determining the touch command corresponding to the second touching point according to the second touching point acquired from the second area. The second processor further comprises: a transmitting unit for transmitting the first touching point to the first processor; and a control unit for controlling the determination unit to terminate the process of determining the touch command corresponding to the second touching point according to the second touching point acquired from the second area. The response unit responds to the first touching point after receiving the first touching point.

It can be seen from the solutions provided by the embodiments of the present application, the touch-type mobile terminal in the embodiments of the present application is equipped with a touch sensing device, the touch sensing device has a first area and a second area, and a first touching point will be responded, when the first touching point and a second touching point are acquired and the first touching point is in the first area while the second touching point is in the second area. With the embodiments of the present application to perform a touch input, no misoperation would occur because one touch command corresponding to one touching point would be responded when touch operations are input in different areas. In particular, a user may not have to only hold edges of the mobile terminal for a purpose of avoiding a misoperation when he/she holds the mobile terminal to operate. Instead, the mobile terminal may respond to useful touch commands automatically and shield the touch commands generated by a misoperation, thus the user experience is enhanced.

DETAILED DESCRIPTION

In a plurality of embodiments of the present application as follows, some of them provide a touch processing method, and others provide a mobile terminal. The mobile terminal in the embodiments of the present application has a structure with a touch sensing device, the touch sensing device has a first area and a second area, a touching point in the first area has a first response level and a touching point in the second area has a second response level, the first response level is higher than the second response level. Further, the mobile terminal in the embodiments of the present application further comprises a first processor for responding to touching points and a second processor for acquiring the touching points.

Solutions in the embodiments of the present application will now be described clearly and fully in details in connection with the accompanying drawings, so that those skilled in the art can understand the solutions in the embodiments of the present application better, and the above objects, features and advantages of the embodiments of the present application would become more apparent.

Figure 1:
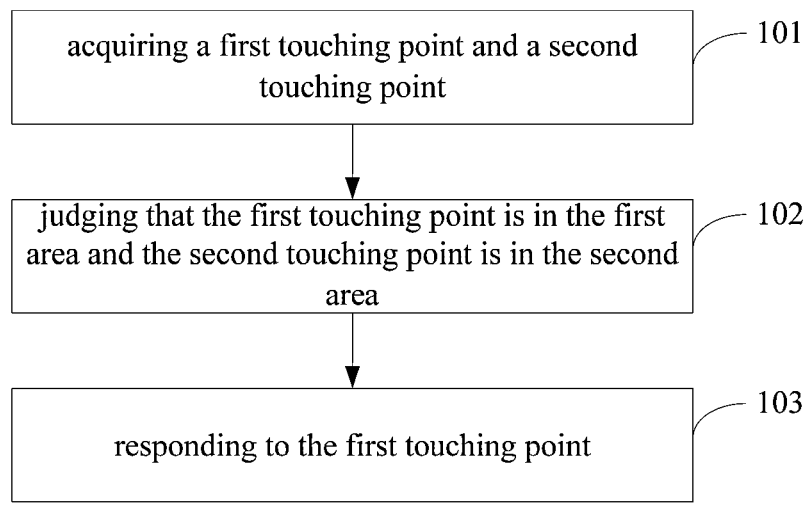
FIG. 1 is a flowchart illustrating a first embodiment of the touch processing method of the present application.

Referring to FIG. 1 which is a flowchart illustrating a first embodiment of the touch processing method of the present application.

Step 101: acquiring a first touching point and a second touching point.

Wherein the touching point in the second area may be acquired during a process of acquiring the first touching point in the first area; the touching point in the first area may be acquired during a process of acquiring the touching point in the second area; the first touching point in the first area and the second touching point in the second area also may be acquired at the same time.

Step 102: judging that the first touching point is in the first area and the second touching point is in the second area.

Step 103: responding to the first touching point and terminating the current flow.

Wherein when the second touching point in the second area is acquired during the process of acquiring the first touching point in the first area, only the first touching point is responded without responding to the second touching point; when the touching point in the first area is acquired during the process of acquiring the touching point in the second area, only the touching point in the first area is responded and the process of acquiring the second touching point is terminated; when the first touching point in the first area and the second touching point in the second area are acquired at the same time, only the first touching point is responded without responding to the second touching point.

Generally, the first area refers to a touch input area corresponding to a display screen, and the second area may be a special touch input area other than the touch input area corresponding to the display screen, wherein the special touch input area is a touch input area for touch gestures (that is, one touch gesture is determined by collecting a plurality of second touching points). Of course, the first area also may be a predetermined area for touch input operations on the touch display screen, and the second area may be edges scope of the touch display screen.

It can be known from the above-described embodiment, when touch operations are input in different areas, no misoperation would occur because one touch command corresponding to one touching point would be responded to. In particular, a user may not have to only hold edges of the mobile terminal for the purpose of avoiding a misoperation when he/she holds the mobile terminal to operate. Instead, the mobile terminal may respond to useful touch commands automatically and shield the touch commands generated by a misoperation, and thus the user experience is enhanced.

In the embodiment of the present application, the first processor may be a CPU (Central Processing Unit) of the mobile terminal, and the second processor may be a MCU (Microcontroller) connecting with the touch sensing device. The MCU may be connected with the CPU, the MCU transmits the touching point in the first area to the CPU, and the MCU transmits the touch command corresponding to the touching points in the second area acquired by the MCU to the CPU. The CPU is used to respond to the received touching point and touch command. When the CPU responds to the received touching point, it determines as an object on the mobile terminal according to a coordination of the touching point; or it determines as a gesture input, for example, a sliding, according to a plurality of the touching points. When the CPU responds to the received touch command, the CPU executes the touch command directly, for example, an instruction for returning to a home page or an instruction for returning to the previous menu. Of course, the functions of the MCU also can be integrated into the CPU and implemented, that is to say, the functions of the first processor and the second processor may be integrated into one processor and implemented, and the embodiments of the present application are not limited hereto.

Figure 2:
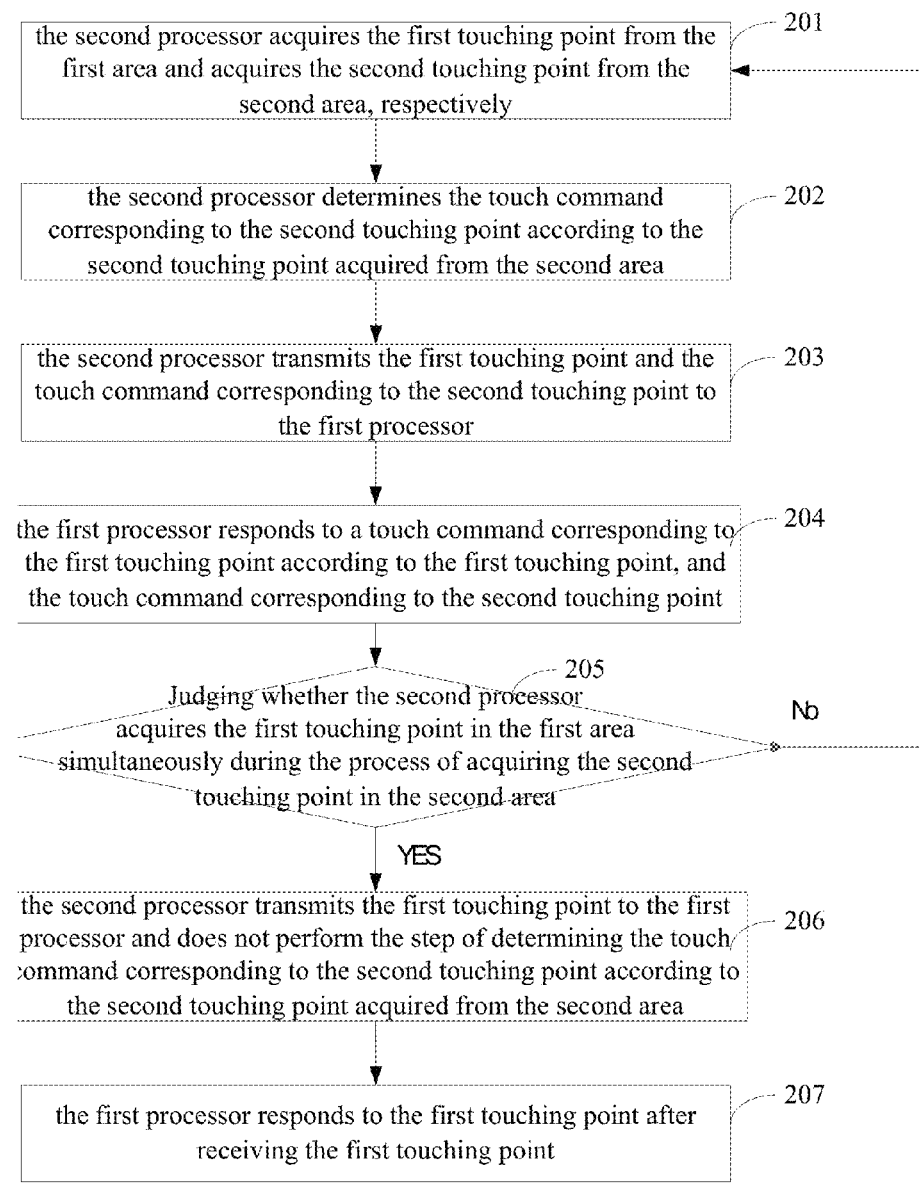
FIG. 2 is a flowchart illustrating a second embodiment of the touch processing method of the present application.

Referring to FIG. 2 which is a flowchart illustrating a second embodiment of the touch processing method of the present application.

Step 201: the second processor acquires a first touching point from a first area and acquires a second touching point from a second area, respectively.

In the second embodiment of the present application, the second processor is connected to the touch sensing device in the mobile terminal, the touch sensing device is generally a touch screen, the first area generally refers to a touch input area corresponding to the display screen and the second area generally refers to a touch input area only for receiving touch gestures. Or, the first area also may be predetermined as a central scope involved in the touch input operations on the touch screen, and the second area is an edge scope on the touch screen, that is, an area which is easily be touched by hands of the user holding the mobile terminal but not used to generate the touch command. It should be noted that, the first area and the second area described above may be defined flexibly depending on actual applications as long as they could respond the useful touch inputs when a misoperation occurs.

Step 202: the second processor determines the touch command corresponding to the second touching point according to the second touching point acquired from the second area.

Step 203: the second processor transmits the first touching point and the touch command corresponding to the second touching point to the first processor.

Step 204: the first processor responds to a touch command corresponding to the first touching point according to the first touching point, and responds to the touch command corresponding to the second touching point.

Step 205: it is judged whether the second processor acquires the first touching point in the first area simultaneously during the process of acquiring the second touching point in the second area, if yes, the process would proceeds to Step 206; otherwise, the process returns to the Step 201.

Step 206: the second processor transmits the first touching point to the first processor and does not perform the step of determining the touch command corresponding to the second touching point according to the second touching point acquired from the second area.

In a case that the second processor acquires the first touching point in the first area simultaneously during the process of acquiring the second touching point in the second area, a misoperation scene corresponding thereto may be a situation as follows: the palm of the user touches the second area continuously and never leaves the second area when the user holds the mobile terminal by a hand, then the second processor may acquire the second touching point continuously; at this time, the second processor acquires the first touching point if the user performs the touch operation in the first area. In the above-described situation, only the first touching point can be transmitted to the first processor, because the second touching point acquired continuously is judged as a misoperation and would not be responded, that is, the second processor does not perform the process for determining the touch command corresponding to the second touching point according to the second touching point acquired from the second area but only transmits the first touching point to the first processor, although the second processor acquires the first touching point and the second touching point at the same time.

Step 207: the first processor responds to the first touching point after receiving the first touching point, and terminates the current flow.

Thus, the mobile terminal may only respond to the first touching point and shield the second touching point when the touch inputs exists both in the first area and in the second area and the touch input in the second area is a misoperation, because the first processor only receives the first touching point and does not receive the touch command corresponding to the second touching point transmitted by the second processor at all.

Figure 3:
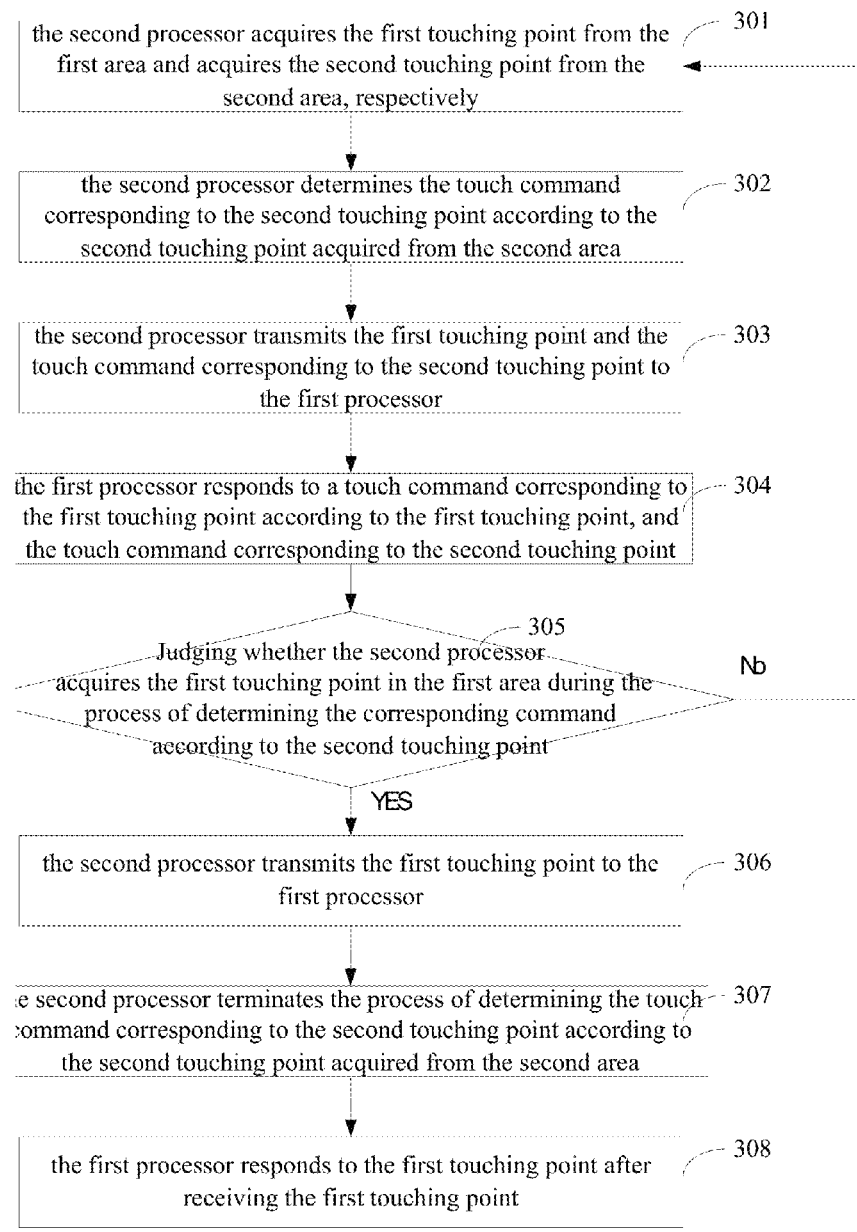
FIG. 3 is a flowchart illustrating a third embodiment of the touch processing method of the present application.

Referring to FIG. 3 which is a flowchart illustrating a third embodiment of the touch processing method of the present application.

Step 301: the second processor acquires a first touching point from a first area and acquires a second touching point from a second area, respectively.

In the third embodiment of the present application, the second processor is connected to the touch sensing device in the mobile terminal, the touch sensing device is generally a touch screen, the first area generally refers to a touch input area corresponding to the display screen and the second area generally refers to a touch input area only for receiving touch gestures. Or, the first area also may be predetermined as a central scope involved in the touch input operations on the touch screen, and the second area is an edge scope on the touch screen, that is, an area which is easily be touched by hands of the user while holding the mobile terminal but not used to generate the touch command. It should be noted that, the first area and the second area described above may be defined flexibly depending on actual applications as long as they could respond the useful touch inputs when a misoperation occurs.

Step 302: the second processor determines the touch command corresponding to the second touching point according to the second touching point acquired from the second area.

Step 303: the second processor transmits the first touching point and the touch command corresponding to the second touching point to the first processor.

Step 304: the first processor responds to a touch command corresponding to the first touching point according to the first touching point, and responds to the touch command corresponding to the second touching point.

Step 305: it is judged whether the second processor acquires the first touching point in the first area during the process of determining the corresponding command according to the second touching point, if yes, the process would proceeds to Step 306; otherwise, the process returns to the Step 301.

Step 306: the second processor transmits the first touching point to the first processor.

Step 307: the second processor terminates the process of determining the touch command corresponding to the second touching point according to the second touching point acquired from the second area.

In a case that the second processor acquires the first touching point in the first area during the process of determining the corresponding command according to the second touching point, a misoperation scene corresponding thereto may be a situation as follows: the palm of the user touches the second area transiently when the user holds the mobile terminal by a hand, then the second processor may acquire the second touching point and determine the touch command corresponding to the second touching point; at this time, the second processor also may acquires the first touching point if the user performs the touch operation in the first area. In the above-described situation, the mobile terminal may judge the second touching point as a misoperation because the first touching point has been input to the first area although the second processor has started to determine the touch command according to the second touching point, thus the operation for determining the touch command corresponding to the second touching point according to the second touching point acquired from the second area is terminated and only the first touching point is transmitted to the first processor.

Step 308: the first processor responds to the first touching point after receiving the first touching point, and terminates the current flow.

Thus, the mobile terminal may only respond to the first touching point and shield the second touching point when the touch inputs exists both in the first area and in the second area and the touch input in the second area is a misoperation, because the first processor only receives the first touching point and does not receive the touch command corresponding to the second touching point transmitted by the second processor at all.

Figure 4:
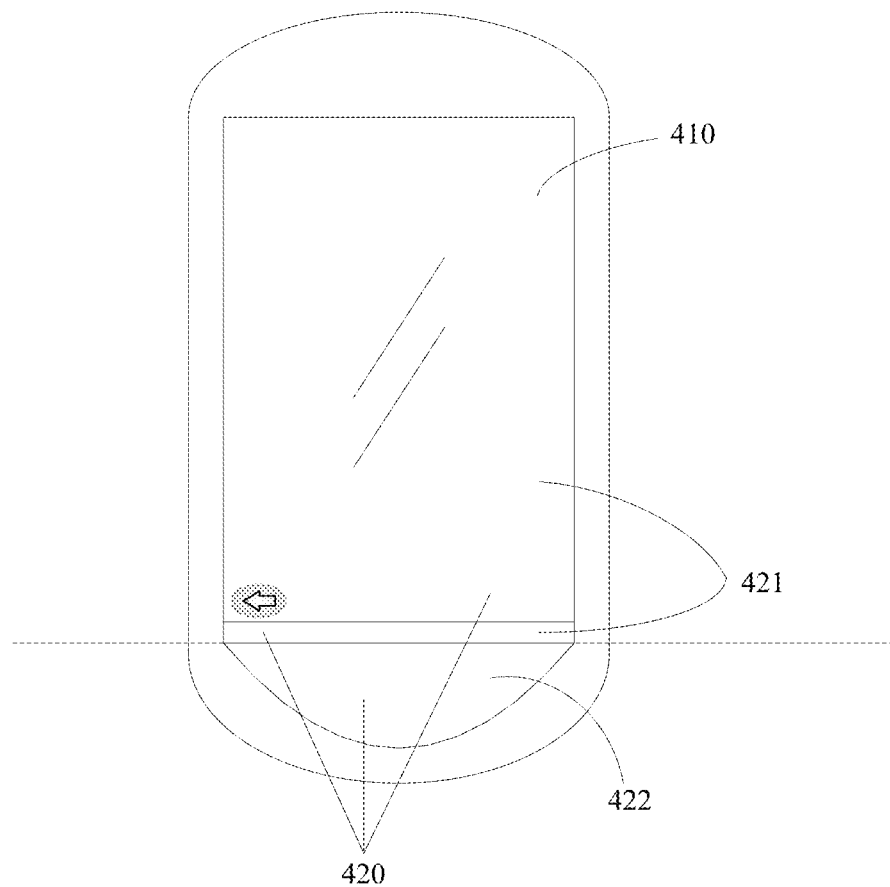
FIG. 4 is a schematic diagram illustrating a structure of a mobile terminal to which the embodiments of the touch processing method of the present application are applied.

Referring to FIG. 4 which is a schematic diagram illustrating a structure of a mobile terminal to which the embodiments of the touch processing method of the present application are applied. The mobile terminal comprises: a display screen 410 and a touch screen 420. Wherein the touch screen 420 comprises a first touch area 421 corresponding to the display screen 410 and a second touch area 422 only for receiving touch gestures. As shown in FIG. 4, the first touch area 421 and the second touch area 422 are separated from each other by a dotted line schematically. Further, the touch screen 420 is connected with a MCU directly and the MCU is connected with a CPU (neither the MCU nor the CPU is shown in FIG. 4). With the mobile terminal illustrated in FIG. 4:

when the first touching point in the first touch area 421 is acquired during a process of acquiring the second touching point in the second touch area 422, the MCU transmits the first touching point to the CPU, the MCU does not perform the step of determining a touch command corresponding to the second touching point according to the second touching point acquired from the second touch area 422, and meanwhile the CPU responds to the first touching point after receiving the first touching point;

when the first touching point in the first touch area 421 is acquired during the process of determining the touch command corresponding to the second touching point according to the second touching point acquired from the second touch area 422, the MCU transmits the first touching point to the CPU, the MCU terminates the step of determining the touch command corresponding to the second touching point according to the second touching point acquired from the second touch area 422, and meanwhile the CPU responds to the first touching point after receiving the first touching point.

Corresponding to the embodiments of touch processing method of the present application, the present application also provides embodiments of a mobile terminal.

Figure 5:
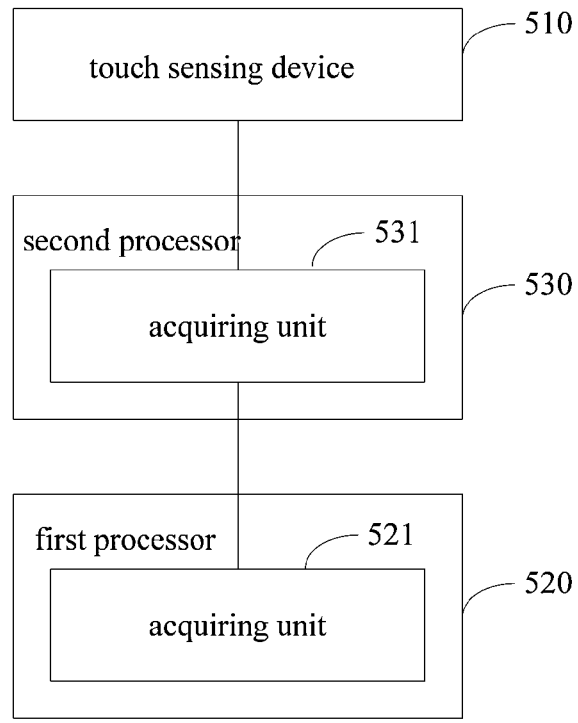
FIG. 5 is a block diagram illustrating a first embodiment of a mobile terminal of the present application.

Referring to FIG. 5 which is a block diagram illustrating a first embodiment of the mobile terminal of the present application, the mobile terminal comprises: a touch sensing device 510, a first processor 520 and a second processor 530.

Wherein the touch sensing device 510 has a first area and a second area, a touching point in the first area has a first response level and a touching point in the second area has a second response level, the first response level is higher than the second response level;

the second processor 530 comprises:
an acquiring unit 531 for acquiring the first touching point and the second touching point from the touch sensing device 510;

the first processor 520 comprises:
a response unit 521 for responding to the first touching point, when the first touching point is in the first area while the second touching point is in the second area.

Figure 6:
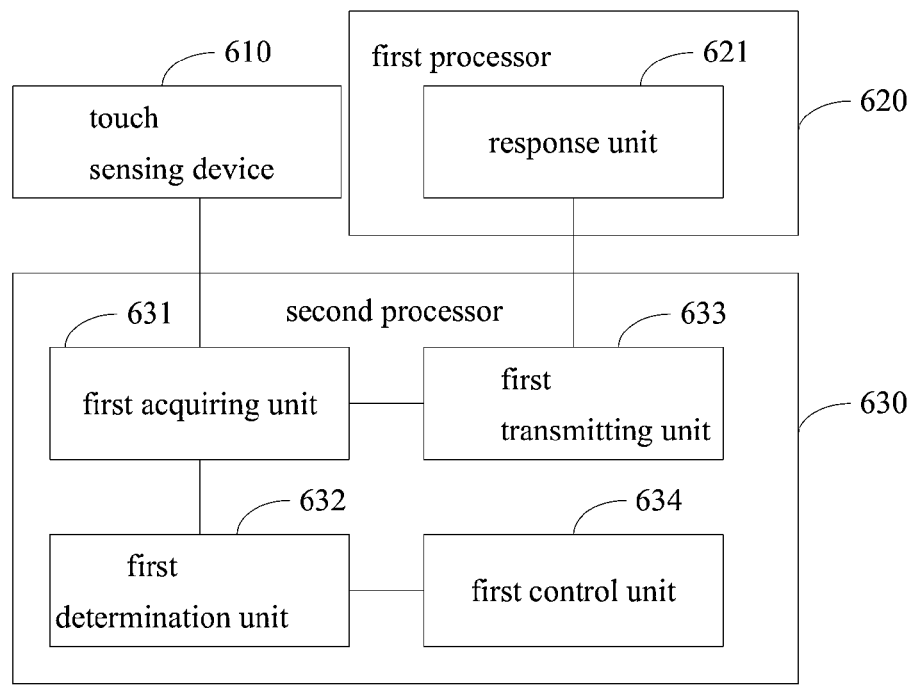
FIG. 6 is a block diagram illustrating a second embodiment of a mobile terminal of the present application.

Referring to FIG. 6 which is a block diagram illustrating a second embodiment of the mobile terminal of the present application, the mobile terminal comprises: a touch sensing device 610, a first processor 620 and a second processor 630.

Wherein the touch sensing device 610 has a first area and a second area, a touching point in the first area has a first response level and a touching point in the second area has a second response level, the first response level is higher than the second response level;

the second processor 630 comprises:
a first acquiring unit 631 for acquiring the first touching point in the first area during a process of acquiring the second touching point in the second area;
a first determination unit 632 for determining a touch command corresponding to the second touching point according to the second touching point acquired from the second area;
a first transmitting unit 633 for transmitting the first touching point to the first processor 620;
a first control unit 634 for controlling the first determination unit 632 not to perform the process of determining the touch command corresponding to the second touching point according to the second touching point acquired from the second area;

the first processor 620 comprises:
a response unit 621 for responding to the first touching point after receiving the first touching point.

Figure 7:
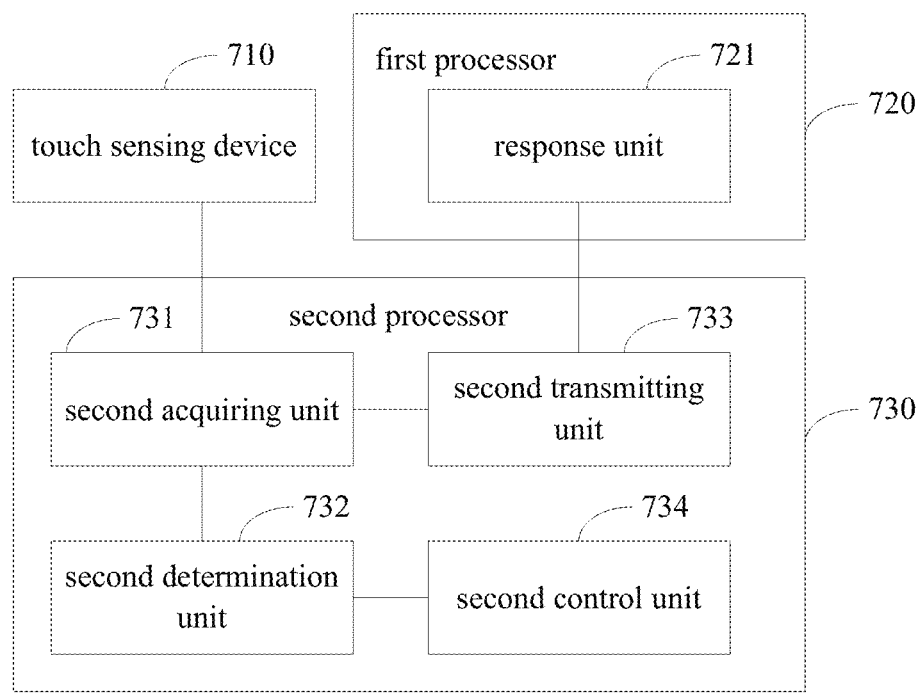
FIG. 7 is a block diagram illustrating a third embodiment of a mobile terminal of the present application.

Referring to FIG. 7 which is a block diagram illustrating a third embodiment of the mobile terminal of the present application, the mobile terminal comprises: a touch sensing device 710, a first processor 720 and a second processor 730.

Wherein the touch sensing device 710 has a first area and a second area, a touching point in the first area has a first response level and a touching point in the second area has a second response level, the first response level is higher than the second response level;

the second processor 730 comprises:

a second acquiring unit 731 for acquiring the first touching point in the first area during a process of determining a touch command corresponding to the second touching point according to the second touching point acquired from the second area;

a second determination unit 732 for determining a touch command corresponding to the second touching point according to the second touching point acquired from the second area;

a second transmitting unit 733 for transmitting the first touching point to the first processor 720;

a second control unit 734 for controlling the second determination unit 732 to terminate the process of determining the touch command corresponding to the second touching point according to the second touching point acquired from the second area;

the first processor 720 comprises:

a response unit 721 for responding to the first touching point after receiving the first touching point.

From the above-described implementations, the touch-type mobile terminal in the embodiments of the present application is equipped with the touch sensing device, the touch sensing device has a first area and a second area, and a first touching point will be responded when the first touching point and a second touching point are acquired and the first touching point is in the first area while the second touching point is in the second area. With the embodiments of the present application to perform a touch input, no misoperation would occur because one touch command corresponding to one touching point would be responded when touch operations are input in different areas. In particular, a user may not have to only hold edges of the mobile terminal for a purpose of avoiding a misoperation when he/she holds the mobile terminal to operate. Instead, the mobile terminal may respond to useful touch commands automatically and shield the touch commands generated by a misoperation, thus the user experience is enhanced.

Those of ordinary skill in the art can clearly understand that solutions in the embodiments of the present application may be implemented in related software plus necessary general hardware platform. Based on such understanding, the basic solutions in the embodiments of the present application or parts contributing to the prior art may be embodied in a form of software product. The computer software product may be stored in a storage medium, for example, a ROM/RAM, a magnetic disk, an optical disk, and the like, and comprise several instructions for causing a computer device (may be a personal computer, a server, or a network device, etc.) to perform the method in respective embodiments or some parts of the embodiment of the present application.

The respective embodiments in the present specification are described in a gradual manner, and the same or similar parts among the embodiments may refer to each other. For each embodiment, the description focuses on the difference from other embodiments. And, the embodiments of a device or a terminal may refer to the related part for the corresponding method embodiments, and the repetition parts are omitted.

The above are only exemplary embodiments of the disclosed solution, but the scope sought for protection is not limited thereto. Instead, any or all modifications or replacements as would be obvious to those skilled in the art are intended to be included within the scope of the present invention. Therefore, the scope of the present invention is defined in the appended claims.

What is claimed is:

1. A touch processing method, which is used for a mobile terminal that includes a touch sensing device, a first processor and a second processor, the touch sensing device has a first area and a second area, a touching point in the first area has a first response level and a touching point in the second area has a second response level, the first response level is higher than the second response level, wherein the method comprises:

the second processor acquiring a first touching point in the first area and always responding to the first touching point;

the second processor acquiring a second touching point in the second area; and the first processor only responding to the first touching point in the first area acquired by the second processor and not responding to a touch command corresponding to the second touching point if the first touching point is acquired before the touch command is responded to; and always responding to the touch command corresponding to the second touching point if the first touching point is not acquired before the touch command is responded to, and only one touch command corresponding to one touching point is responded to when touch operations are input in different areas.

2. The touch processing method as claimed in claim 1, wherein acquiring the first touching point and the second touching point comprises:

acquiring the second touching point in the second area during a process of acquiring the first touching point in the first area.

3. The touch processing method as claimed in claim 1, wherein acquiring the first touching point and the second touching point comprises:

acquiring the first touching point in the first area during a process of acquiring the second touching point in the second area, the touch processing method further comprising: the second processor terminating the acquiring of the second touching point.

4. The touch processing method as claimed in claim 1, wherein acquiring the first touching point and the second touching point comprises:

acquiring the first touching point in the first area and the second touching point in the second area at the same time.

5. The touch processing method as claimed in claim 1, wherein the touch command corresponding to the second touching point is determined by the second processor according to the second touching point acquired from the second area.

6. The touch processing method as claimed in claim 5, wherein acquiring the first touching point in the first area during the process of acquiring the second touching point in the second area further comprises:

the second processor transmitting the first touching point to the first processor;

the second processor not performing the step of determining the touch command corresponding to the second touching point according to the second touching point acquired from the second area; and responding to the first touching point comprises:

the first processor responding to the first touching point after receiving the first touching point.

7. The touch processing method as claimed in claim 5, wherein
acquiring the first touching point in the first area during the process of determining the touch command corresponding to the second touching point according to the second touching point acquired from the second area further comprises:
the second processor transmitting the first touching point to the first processor;
the second processor terminating the step of determining the touch command corresponding to the second touching point according to the second touching point acquired from the second area; and
responding to the first touching point comprises:
the first processor responding to the first touching point after receiving the first touching point.

8. The touch processing method as claimed in claim 1, wherein the touching point in the first area is responded to in a first response mode and the touching point in the second area is responded to in a second response mode, and the first response mode is different from the second response mode.

9. The touch processing method as claimed in claim 8, wherein
the first touching point is responded to in the first response mode when the second processor determines the first touching point is in the first area, and the first response mode is to transmit the first touching point to a first processor;
the second touching point is responded in the second response mode when the second processor determines the second touching point is in the second area, and the second response mode is to obtain a touch command corresponding to the second touching point and transmit the touch command to the first processor.

10. A mobile terminal comprising a touch sensing device, wherein the touch sensing device has a first area and a second area, a touching point in the first area has a first response level and a touching point in the second area has a second response level, the first response level is higher than the second response level, further comprising a first processor and a second processor, wherein,
the second processor comprises:
an acquiring unit for acquiring a first touching point in the first area that always responds to the first touching point;
an acquiring unit for acquiring a second touching point in the second area;
the first processor comprises:
a response unit for only responding to the first touching point in the first area acquired by the acquiring unit and not responding to a touch command corresponding to the second touching point if the first touching point is acquired before the touch command is responded to; and always responding to the touch command corresponding to the second touching point if the first touching point is not acquired before the touch command is responded to, and
only one touch command corresponding to one touching point is responded to when touch operations are input in different areas.

11. The mobile terminal as claimed in claim 10, wherein the second processor further comprises: a determination unit for determining a touch command corresponding to the second touching point according to the second touching point acquired from the second area.

12. The mobile terminal as claimed in claim 11, wherein
the acquiring unit acquires the first touching point in the first area during a process of acquiring the second touching point in the second area;
the second processor further comprises: a transmitting unit for transmitting the first touching point to the first processor, and a control unit for controlling the determination unit not to perform the process of determining the touch command corresponding to the second touching point according to the second touching point acquired from the second area; and
the response unit responds to the first touching point after receiving the first touching point.

13. The mobile terminal as claimed in claim 11, wherein the acquiring unit acquires the first touching point in the first area during the process of determining the touch command corresponding to the second touching point according to the second touching point acquired from the second area;
the second processor further comprises: a transmitting unit for transmitting the first touching point to the first processor; and a control unit for controlling the determination unit to terminate the process of determining the touch command corresponding to the second touching point according to the second touching point acquired from the second area; and
the response unit responds to the first touching point after receiving the first touching point.

14. The mobile terminal as claimed in claim 10, wherein the touching point in the first area is responded to in a first response mode and the touching point in the second area is responded to in a second response mode, and the first response mode is different from the second response mode.

15. The mobile terminal as claimed in claim 14, wherein:
the first touching point is responded to in the first response mode when the second processor determines the first touching point is in the first area, and the first response mode is to transmit the first touching point to the first processor;
the second touching point is responded in the second response mode when the second processor determines the second touching point is in the second area, and the second response mode is to obtain a touch command corresponding to the second touching point and transmit the touch command to the first processor.

* * * * *